United States Patent
Gwon et al.

(10) Patent No.: US 10,047,829 B2
(45) Date of Patent: Aug. 14, 2018

(54) DOUBLE CLUTCH TRANSMISSION FOR VEHICLE

(71) Applicant: Hyundai Motor Company, Seoul (KR)

(72) Inventors: Yeo Hyeon Gwon, Yongin-si (KR); Ki Jong Park, Osan-si (KR)

(73) Assignee: Hyundai Motor Company, Seoul (KR)

( * ) Notice: Subject to any disclaimer, the term of this patent is extended or adjusted under 35 U.S.C. 154(b) by 292 days.

(21) Appl. No.: 14/883,877

(22) Filed: Oct. 15, 2015

(65) Prior Publication Data

US 2016/0341285 A1    Nov. 24, 2016

(30) Foreign Application Priority Data

May 18, 2015  (KR) .................. 10-2015-0068788

(51) Int. Cl.
    *F16H 3/08*   (2006.01)
    *F16H 3/00*   (2006.01)
    *F16H 3/093*  (2006.01)

(52) U.S. Cl.
    CPC ..... *F16H 3/006* (2013.01); *F16H 2003/0931* (2013.01); *F16H 2200/006* (2013.01); *F16H 2200/0065* (2013.01); *F16H 2200/0069* (2013.01)

(58) Field of Classification Search
    CPC .................. F16H 37/021; F16H 2003/0931
    USPC ................... 74/330, 331, 333, 340
    See application file for complete search history.

(56) References Cited

U.S. PATENT DOCUMENTS

| 7,621,195 | B2 | 11/2009 | Hattori | |
| 8,342,049 | B2* | 1/2013 | Rieger | F16H 3/006 |
| | | | | 74/330 |
| 8,356,528 | B2* | 1/2013 | Kuma | F16H 3/093 |
| | | | | 74/329 |
| 8,365,626 | B2* | 2/2013 | Rieger | F16H 3/006 |
| | | | | 74/330 |

FOREIGN PATENT DOCUMENTS

| EP | 2 578 901 A1 | 4/2013 |
| JP | 2007-331654 A | 12/2007 |
| JP | 2008-309332 A | 12/2008 |
| JP | 2010-164192 A | 7/2010 |
| KR | 10-2011-0024793 A | 3/2011 |
| KR | 10-1034890 B1 | 5/2011 |
| KR | 10-2015-0012150 A | 2/2015 |
| KR | 10-1509982 B1 | 4/2015 |

* cited by examiner

*Primary Examiner* — Ha Dinh Ho
(74) *Attorney, Agent, or Firm* — Morgan, Lewis & Bockius LLP

(57) ABSTRACT

A double clutch transmission for a vehicle may include a first input shaft receiving power through a first clutch, a second input shaft disposed coaxially with the first input shaft and receiving power through a second clutch, a plurality of odd driving gears disposed on the first input shaft to implement odd ranges of a 3-range or more, a plurality of even driving gears disposed on the second input shaft to implement even ranges of a 2-range to an 8-range, a first output shaft and a second output shaft disposed in parallel with the first input shaft and the second input shaft, a plurality of odd driven gears to implement odd ranges by engaging with the odd driving gears, a plurality of even driven gears to implement even ranges by engaging with the even driving gears, and a joint synchro.

14 Claims, 5 Drawing Sheets

FIG. 2

| | CLUTCH | | SYNCHRO SHIFTING (TEN STEPS) | | | | | | | | | |
|---|---|---|---|---|---|---|---|---|---|---|---|---|
| | C1 | C2 | ST | S2 | S3 | S4 | S5 | S6 | S7 | S8 | S9 | SR |
| R1 | ● | | ● | | | | | | | | | ● |
| R2 | | ● | | | | | | | | | | ● |
| 1 | ● | | ● | ● | | | | | | | | |
| 2 | | ● | ● | | | | | | | | | |
| 3 | ● | | | | ● | | | | | | | |
| 4 | | ● | | | | ● | | | | | | |
| 5 | ● | | | | | | ● | | | | | |
| 6 | | ● | | | | | | ● | | | | |
| 7 | ● | | | | | | | | ● | | | |
| 8 | | ● | | | | | | | | ● | | |
| 9 | ● | | | | | | | | | | ● | |
| 10 | | ● | ● | | | | | | ● | | | |

FIG. 3

| | CLUTCH | | SYNCHRO SHIFTING (TEN STEPS) | | | | | | | | | |
|---|---|---|---|---|---|---|---|---|---|---|---|---|
| | C1 | C2 | ST | S2 | S3 | S4 | S5 | S6 | S7 | S8 | S9 | SR |
| R1 | ● | | ● | | | | | | | | | ● |
| R2 | | ● | | | | | | | | | | ● |
| 1 | ● | | ● | ● | | | | | | | | |
| 2 | | ● | | ● | | | | | | | | |
| 3 | ● | | | | ● | | | | | | | |
| 4 | | ● | | | | ● | | | | | | |
| 5 | ● | | | | | | ● | | | | | |
| 6 | | ● | | | | | | ● | | | | |
| 7 | ● | | | | | | | | ● | | | |
| 8 | | ● | | | | | | | | ● | | |
| 9 | ● | | | | | | | | | | ● | |

| | CLUTCH | | SYNCHRO SHIFTING (TEN STEPS) | | | | | | | | | |
|---|---|---|---|---|---|---|---|---|---|---|---|---|
| | C1 | C2 | ST | S2 | S3 | S4 | S5 | S6 | S7 | S8 | S9 | SR |
| R1 | ● | | ● | | | | | | | | | ● |
| R2 | | ● | | | | | | | | | | ● |
| 1 | ● | | ● | ● | | | | | | | | |
| 2 | | ● | | ● | | | | | | | | |
| 3 | ● | | | | ● | | | | | | | |
| 4 | | ● | | | | ● | | | | | | |
| 5 | ● | | | | | | ● | | | | | |
| 6 | | ● | | | | | | ● | | | | |
| 7 | ● | | | | | | | | ● | | | |
| 8 | | ● | | | | | | | | ● | | |

DOUBLE CLUTCH TRANSMISSION FOR VEHICLE

CROSS REFERENCE TO RELATED APPLICATION

The present application claims priority to Korean Patent Application No. 10-2015-0068788, filed May 18, 2015, the entire contents of which is incorporated herein for all purposes by this reference.

BACKGROUND OF THE INVENTION

Field of the Invention

The present invention generally relates to a double clutch transmission for a vehicle. More particularly, the present invention relates to a transmission that can be maximally reduced in length and achieve a plurality of steps of shifting.

Description of Related Art

A double clutch transmission (DCT) essentially includes two input shafts of synchro-mesh type manual transmissions of the related art, receives power from an engine through two clutches, and sequentially engages adjacent shift gears on the input shafts.

Accordingly, in the double clutch transmission, shift gears that are always in mesh with each other are disposed between the input shafts and an output shaft parallel with the input shafts and synchronizers for selectively coupling/decoupling the shift gears to/from the input shafts or the output shaft, such that the entire length and the number of available ranges of the transmission depend on the number of shift gears and synchronizers.

In order to maximize fuel efficiency by maintaining operation efficiency of an engine in an optimal stage in a vehicle, it is required to increase the ranges that can be maximally achieved by a transmission. However, increasing the number of ranges increases the entire length of a transmission, so the transmission is difficult to mount on a vehicle and increases in weight, and accordingly, it may have an adverse influence on the fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a double clutch transmission for a vehicle that can be reduced in weight and easily mounted on a vehicle, because the entire length is small, and that can perform shifting in multiple steps of eight to ten steps forward.

According to various aspects of the present invention, a double clutch transmission for a vehicle may include a first input shaft receiving power through a first clutch, a second input shaft disposed coaxially with the first input shaft and receiving power through a second clutch, a plurality of odd driving gears disposed on the first input shaft to implement odd ranges of a 3-range or more, a plurality of even driving gears disposed on the second input shaft to implement even ranges of a 2-range to an 8-range, a first output shaft and a second output shaft disposed in parallel with the first input shaft and the second input shaft, a plurality of odd driven gears disposed on the first output shaft and the second output shaft to implement odd ranges by engaging with the odd driving gears, a plurality of even driven gears disposed on the first output shaft and the second output shaft to implement even ranges by engaging with the even driving gears, and a joint synchro disposed on the first output shaft or the second output shaft and coupling or decoupling any one of the odd driven gears on the corresponding shaft and any one of the even driven gears with or from each other.

The odd driving gears on the first input shaft may include a third driving gear for implementing the 3-range, a fifth driving gear for implementing the 5-range, and a seventh-ninth driving gear for implementing the 7-range and a 9-range, and the even driving gears on the second input shaft may include a second driving gear for implementing the 2-range, a fourth driving gear for implementing the 4-range, and a sixth-eighth driving gear for implementing the 6-range and the 8-range.

The odd driven gears and even driven gears on the first output shaft may include a second driven gear for implementing the 2-range, a third driven gear for implementing the 3-range, a sixth driven gear for implementing the 6-range, and a seventh driven gear for implementing the 7-range, and the odd driven gears and even driven gears on the second output shaft may include a fourth driven gear for implementing the 4-range, a fifth driven gear for implementing the 5-range, an eighth driven gear for implementing the 8-range, and a ninth driven gear for implementing the 9-range.

The fifth driven gear and the eighth driven gear may be adjacent to each other on the second output shaft, and the joint synchro may couple or decouple the fifth driven gear and the eighth driven gear to or from each other.

The second driven gear, the sixth driven gear, the third driven gear, and the seventh driven gear may be sequentially disposed on the first output shaft, and a reverse driven gear for a reverse range may be disposed between the second driven gear and the sixth driven gear on the first output shaft.

The double clutch transmission may further include an idler shaft disposed in parallel with the first output shaft, a first idler gear rotatably disposed on the idler shaft and engaged with the fourth driving gear, and a second idler gear integrally connected with the first idler gear and engaged with the reverse driven gear.

A parking gear may be integrally disposed on the second output shaft in parallel with the second driving gear and the second driven gear.

The fourth driven gear, the eighth driven gear, the fifth driven gear, and the ninth driven gear may be sequentially disposed on the second output shaft.

The joint synchro may be disposed between the fifth driven gear and the eighth driven gear to couple or decouple the fifth driven gear and the eighth driven gear to or from each other, and a hub of the joint synchro may be integrally connected to the eighth driven gear.

A first output gear for receiving power in mesh with a differential may be integrally disposed on the first output shaft, and a second output gear for receiving power in mesh with the differential separately from the first output shaft may be integrally disposed on the second shaft.

The odd driving gears on the first input shaft may include a third driving gear for implementing the 3-range, a fifth driving gear for implementing the 5-range, and a seventh driving gear for implementing the 7-range, and the even driving gears on the second input shaft may include a second driving gear for implementing the 2-range, a fourth driving gear for implementing the 4-range, and a sixth-eighth driving gear for implementing the 6-range and the 8-range.

The odd driven gears and even driven gears on the first output shaft may include a second driven gear for implementing the 2-range, a third driven gear for implementing the 3-range, a sixth driven gear for implementing the 6-range, and a seventh driven gear for implementing the 7-range, and the odd driven gears and even driven gears on the second output shaft may include a fourth driven gear for implementing the 4-range, a fifth driven gear for implementing the 5-range, and an eighth driven gear for implementing the 8-range.

The fifth driven gear and the eighth driven gear may be adjacent to each other on the second output shaft, the joint synchro couples or decouples the fifth driven gear and the eighth driven gear to or from each other, and a hub of the joint synchro may be integrally connected to the eighth driven gear.

The second driven gear, the sixth driven gear, the third driven gear, and the seventh driven gear may be sequentially disposed on the first output shaft, and a reverse driven gear for a reverse range may be disposed between the second driven gear and the sixth driven gear on the first output shaft.

The fourth driven gear, the eighth driven gear, and the fifth driven gear may be sequentially disposed on the second output shaft, and a parking gear may be integrally disposed at a side of the fourth driven gear on the second output shaft in parallel with the second driving gear and the second driven gear.

According to the present invention, a double clutch transmission for a vehicle can be reduced in weight and easily mounted on a vehicle, because the entire length is small, and can perform shifting in multiple steps of eight to ten steps forward.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is a table showing operation modes for ten steps of forward shifting and two steps of reverse shifting with the exemplary transmission shown in FIG. 1.

FIG. 3 is a table showing operation modes for nine steps of forward shifting and two steps of reverse shifting with the exemplary transmission shown in FIG. 1.

Figure 1:
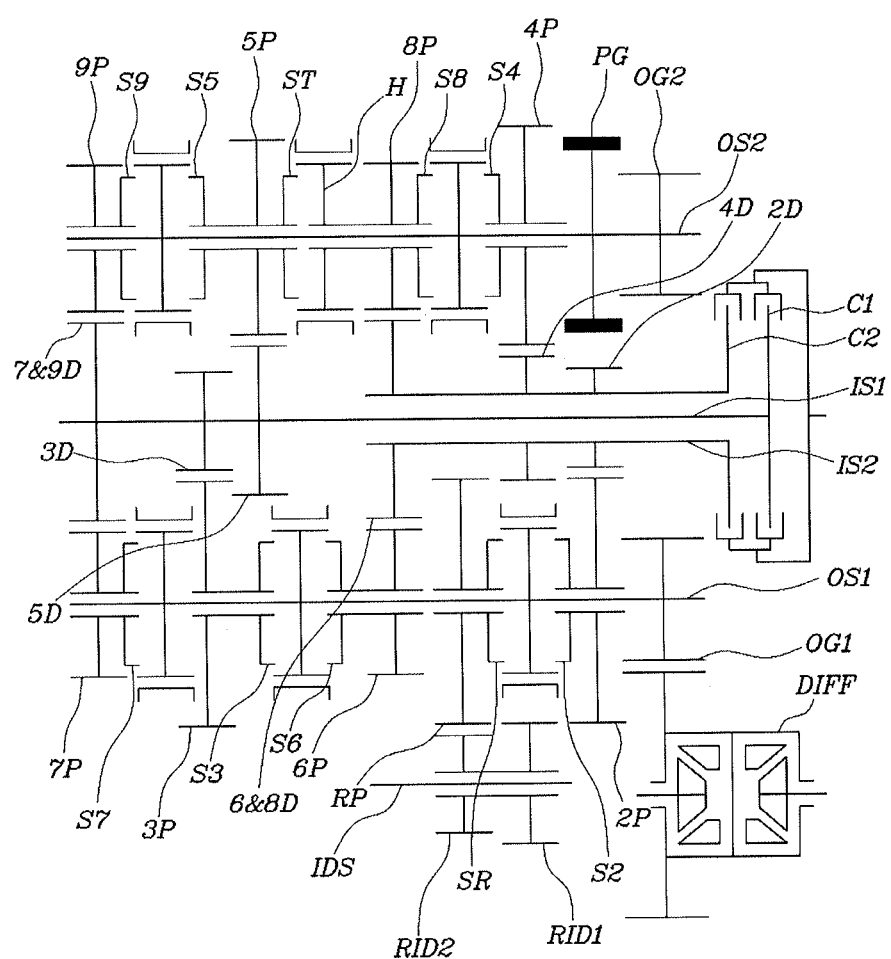
FIG. 1 is a diagram showing the configuration of an exemplary double clutch transmission for a vehicle according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 to 6, a double clutch transmission for a vehicle according to various embodiments of the present invention includes a first input shaft IS1 receiving power through a first clutch C1, a second input shaft IS2 disposed coaxially with the first input shaft IS1 and receiving power through a second clutch C2, a plurality of odd driving gears disposed on the first input shaft to implement odd ranges of a 3-range or more, a plurality of even driving gears disposed on the second input shaft to implement even ranges of a 2-range to an 8-range, a first output shaft OS1 and a second output shaft OS2 disposed in parallel with the first input shaft and the second input shaft, a plurality of odd driven gears disposed on the first output shaft and the second output shaft to implement odd ranges by engaging with the odd driving gears, a plurality of even driven gears disposed on the first output shaft and the second output shaft to implement even ranges by engaging with the even driving gears, and a joint synchro ST disposed on the first output shaft or the second output shaft and coupling or decoupling any one of the odd driven gears on the corresponding shaft and any one of the even driven gears with or from each other.

The odd driving gears on the first input shaft include a third driving gear 3D for implementing the 3-range, a fifth driving gear 5D for implementing the 5-range, and a seventh-ninth driving gear 7&9D for implementing the 7-range and the 9-range.

The even driving gears on the second input shaft include a second driving gear 2D for implementing the 2-range, a fourth driving gear 4D for implementing the 4-range, and a sixth-eighth driving gear 6&9D for implementing the 6-range and the 8-range.

The odd driven gears and even driven gears on the first output shaft include a second driven gear 2P for implementing the 2-range, a third driven gear 3P for implementing the 3-range, a sixth driven gear 6P for implementing the 6-range, and a seventh driven gear 7P for implementing the 7-range.

The odd driven gears and even driven gears on the second output shaft include a fourth driven gear 4P for implementing the 4-range, a fifth driven gear 5P for implementing the 5-range, an eighth driven gear 8P for implementing the 8-range, and a ninth driven gear 9P for implementing the 9-range.

The fifth driven gear 5P and the eighth driven gear 8P are adjacent to each other on the second output shaft and the joint synchro ST may couple or decouple the fifth driven gear 5P and the eighth driven gear 8P.

The second driven gear 2P, the sixth driven gear 6P, the third driven gear 3P, and the seventh driven gear 7P are sequentially disposed on the first output shaft, and a reverse driven gear RP for a reverse range is disposed between the second driven gear 2P and the sixth driven gear 6P on the first output shaft.

In order to implement the reverse range with the reverse driven gear, there are provided an idler shaft IDS disposed in parallel with the first output shaft, a first idler gear RID1 rotatably disposed on the idler shaft and engaged with the fourth driving gear, and a second idler gear RID2 integrally connected with the first idler gear and engaged with the reverse driven gear.

A parking gear PG is integrally disposed on the second output shaft in parallel with the second driving gear 2D and the second driven gear 2P to prevent an increase in length of the transmission by unnecessarily occupying a space.

The fourth driven gear 4P, the eighth driven gear 8P, the fifth driven gear 5P, and the ninth driven gear 9P are sequentially disposed on the second output shaft.

The joint synchro ST is disposed between the fifth driven gear and the eighth driven gear to couple or decouple the fifth driven gear and the eighth driven gear and a hub H of the joint synchro is integrally connected to the eighth driven gear 8P.

For reference, the second driven gear 2P to the ninth drive gear 9P are rotatably disposed on the first output shaft or the second output shaft and synchronizers selectively couple/decouple the driven gears for the ranges to/from the first output shaft or the second output shaft, similar to the synchro-mesh shifting mechanism in the related art. Further, a second synchro S2, a third synchro S3, a fourth synchro S4, a fifth synchro S5, a sixth synchro S5, a seventh synchro S7, an eighth synchro S8, and a ninth synchro S9 are disposed at sides of the driven gears and a reverse synchro SR is disposed on the first output shaft OS1 at a side of the rear driven gear to selectively couple/decouple the reverse driven gear to/from the first output shaft.

A first output gear OG1 for taking power in mesh with a differential DIFF is integrally disposed on the first output shaft and a second output gear OG2 for taking power in mesh with the differential separately from the first output shaft is integrally disposed on the second shaft.

Specific shift gears for the 1-range to the 10-range are not provided in the configuration of various embodiments of the present invention described above, but ten steps of forward shifting and two steps of reverse shift can be achieved, as shown in FIG. 2, so it is possible to achieve a plurality of steps of shifting with fewer shift gears while reducing the weight and entire length of the transmission. Accordingly, it is possible to greatly contribute to improving fuel efficiency of a vehicle by improving energy efficiency of the vehicle.

Figure 4:
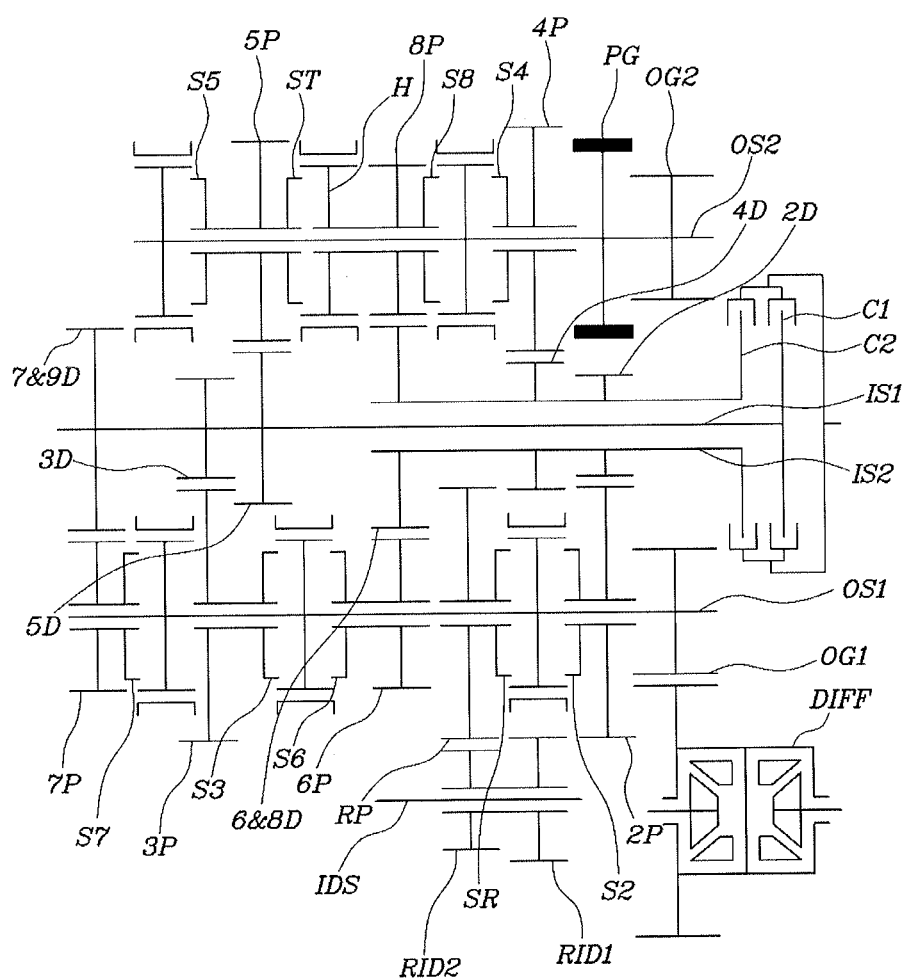
FIG. 4 is a diagram showing the configuration of an exemplary transmission that can perform eight steps of forward shifting in accordance with the present invention.
Figures 5, 6:
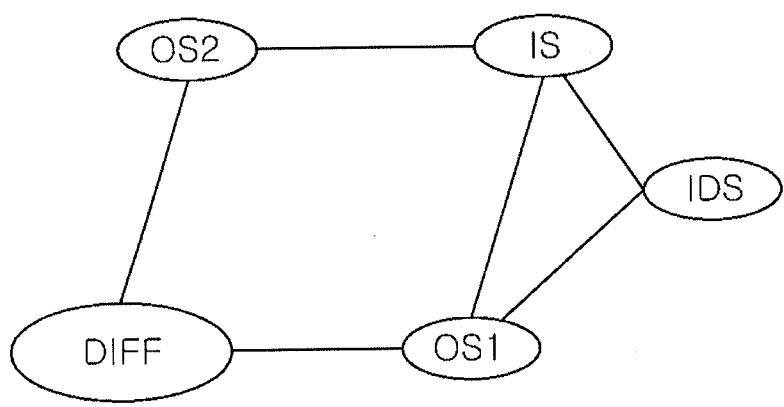
FIG. 5 is a table showing operation modes for eight steps of forward shifting and two steps of reverse shifting with the exemplary transmission shown in FIG. 4.
FIG. 6 is a diagram illustrating arrangement of shafts in the exemplary transmissions of FIG. 1 and FIG. 4, when seen from a side.

It is possible to achieve a transmission that can implement eight steps of forward shifting and two steps of reverse shifting, as shown in FIG. 4, by removing only the ninth driven gear 9P and the ninth synchro S9, so the other configuration is the same and not described in detail.

A method of implementing the 1-range and the 10-range and a method of implementing the reverse 1-range and the reverse 2-range with the transmission shown in FIG. 1 will be described hereafter and the other ranges are implemented in the same was as in the DCT of the related art, so they are not described.

The 1-range is implemented by engaging the first clutch C1, coupling the fifth driven gear and the eighth driven gear with the joint synchro ST, and coupling the second driven gear to the first output shaft with the second synchro S2.

In this state, power from the engine is transmitted to the fifth driving gear and the fifth driven gear through the first clutch and the first input shaft and then transmitted sequentially through the eighth driven gear and the eighth driving gear by the joint synchro, thereby driving the second input shaft. Further, the second driven gear integrally disposed on the second input shaft drives the second driven gear and the second driven gear transmits power to the first output shaft by the second synchro, so power is outputted to the differential through the first output gear and the output is supplied to driving wheel through the 1-range.

The transmission gear ratio in the 1-range is obtained from "transmission gear ratio in the 5-range/transmission gear ratio in the eighth-range×gear ratio in the second gear".

In order to implement the 10-range, the second clutch C2 is engaged, the joint synchro ST is engaged, and the seventh drive gear is coupled to the first output shaft by the seventh synchro S7.

In this state, power from the engine is transmitted to the second shaft through the second clutch and then outputted to the differential through the second shaft sequentially via the eighth driving gear and eighth driven gear, the joint synchro, the fifth driven gear and fifth driving gear, the first input shaft, and the seventh driving gear and seventh drive gear, there by forming the transmission gear ratio of the 10-range.

The transmission gear ratio in the 10-range is obtained from "transmission gear ratio in the 8-range/transmission gear ratio in the 5-range×transmission gear ratio in the 7-range".

In order to implement the reverse 1-range, the first clutch C1 is engaged, the joint synchro ST is engaged, and the reverse synchro SR is engaged, in which power from the engine is transmitted to the first output shaft from the first clutch and the first input shaft sequentially through the fifth driving gear and fifth driven gear, the joint synchro, the eighth driven gear and the eighth driving gear, the second input shaft, the fourth driving gear, the first and second idler gears, the reverse driven gear, and the reverse synchro, and consequently, the power is transmitted to the driving wheels through the differential from the first output gear, thereby output of the reverse 1-range is obtained.

In order to implement the reverse 2-range R2, the second clutch C2 is engaged and the second reverse synchro SR is engaged, in which power from the engine is transmitted to the first output shaft from the second clutch and the second output shaft through the fourth driving gear, the first and second idler gears, the reverse driven gear, and the reverse synchro, and consequently, the output of the reverse 2-range is transmitted to the driving wheels from the first output gear through the differential.

In the various embodiments of the present invention described above, it is possible to implement the 1-range to the 10-range without using specific shift gears for the 1-range to the 10-range. Further, operation modes for implementing the 1-range to the 9-range are shown in FIG. 3 for reference, but when the ninth driven gear and the ninth synchro are removed as in FIG. 4, the transmission can be control to implement forward 1-range to 8-range as in FIG. 5.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A double clutch transmission for a vehicle, comprising:
a first input shaft receiving power through a first clutch;
a second input shaft disposed coaxially with the first input shaft and receiving power through a second clutch;
a plurality of odd driving gears disposed on the first input shaft to implement odd ranges of a 3-range or more;
a plurality of even driving gears disposed on the second input shaft to implement even ranges of a 2-range to an 8-range;
a first output shaft and a second output shaft disposed in parallel with the first input shaft and the second input shaft;
a plurality of odd driven gears disposed on the first output shaft and the second output shaft to implement odd ranges by engaging with the odd driving gears;
a plurality of even driven gears disposed on the first output shaft and the second output shaft to implement even ranges by engaging with the even driving gears; and
a joint synchro disposed on the first output shaft or the second output shaft and coupling or decoupling any one of the odd driven gears on the corresponding shaft and any one of the even driven gears with or from each other,
wherein the odd driving gears on the first input shaft comprise a third driving gear for implementing the 3-range, a fifth driving gear for implementing the 5-range, and a seventh-ninth driving gear for implementing the 7-range and a 9-range, and
wherein the even driving gears on the second input shaft comprise a second driving gear for implementing the 2-range, a fourth driving gear for implementing the 4-range, and a sixth-eighth driving gear for implementing the 6-range and the 8-range.

2. The double clutch transmission of claim 1,
wherein the odd driven gears and even driven gears on the first output shaft comprise a second driven gear for implementing the 2-range, a third driven gear for implementing the 3-range, a sixth driven gear for implementing the 6-range, and a seventh driven gear for implementing the 7-range, and
wherein the odd driven gears and even driven gears on the second output shaft comprise a fourth driven gear for implementing the 4-range, a fifth driven gear for implementing the 5-range, an eighth driven gear for implementing the 8-range, and a ninth driven gear for implementing the 9-range.

3. The double clutch transmission of claim 2, wherein the fifth driven gear and the eighth driven gear are adjacent to each other on the second output shaft, and
the joint synchro couples or decouples the fifth driven gear and the eighth driven gear to or from each other.

4. The double clutch transmission of claim 2, wherein the second driven gear, the sixth driven gear, the third driven gear, and the seventh driven gear are sequentially disposed on the first output shaft, and
a reverse driven gear for a reverse range is disposed between the second driven gear and the sixth driven gear on the first output shaft.

5. The double clutch transmission of claim 4, further comprising:
an idler shaft disposed in parallel with the first output shaft;
a first idler gear rotatably disposed on the idler shaft and engaged with the fourth driving gear; and
a second idler gear integrally connected with the first idler gear and engaged with the reverse driven gear.

6. The double clutch transmission of claim 2, wherein a parking gear is integrally disposed on the second output shaft in parallel with the second driving gear and the second driven gear.

7. The double clutch transmission of claim 2, wherein the fourth driven gear, the eighth driven gear, the fifth driven gear, and the ninth driven gear are sequentially disposed on the second output shaft.

8. The double clutch transmission of claim 7, wherein the joint synchro is disposed between the fifth driven gear and the eighth driven gear to couple or decouple the fifth driven gear and the eighth driven gear to or from each other, and
a hub of the joint synchro is integrally connected to the eighth driven gear.

9. The double clutch transmission of claim 2, wherein a first output gear for receiving power in mesh with a differential is integrally disposed on the first output shaft, and
a second output gear for receiving power in mesh with the differential separately from the first output shaft is integrally disposed on the second shaft.

10. A double clutch transmission for a vehicle, comprising:
a first input shaft receiving power through a first clutch;
a second input shaft disposed coaxially with the first input shaft and receiving power through a second clutch;
a plurality of odd driving gears disposed on the first input shaft to implement odd ranges of a 3-range or more;
a plurality of even driving gears disposed on the second input shaft to implement even ranges of a 2-range to an 8-range;
a first output shaft and a second output shaft disposed in parallel with the first input shaft and the second input shaft;
a plurality of odd driven gears disposed on the first output shaft and the second output shaft to implement odd ranges by engaging with the odd driving gears;
a plurality of even driven gears disposed on the first output shaft and the second output shaft to implement even ranges by engaging with the even driving gears; and
a joint synchro disposed on the first output shaft or the second output shaft and coupling or decoupling any one of the odd driven gears on the corresponding shaft and any one of the even driven gears with or from each other,
wherein the odd driving gears on the first input shaft comprise a third driving gear for implementing the 3-range, a fifth driving gear for implementing the 5-range, and a seventh driving gear for implementing the 7-range, and wherein the even driving gears on the second input shaft comprise a second driving gear for implementing the 2-range, a fourth driving gear for implementing the 4-range, and a sixth-eighth driving gear for implementing the 6-range and the 8-range.

11. The double clutch transmission of claim 10, wherein the odd driven gears and even driven gears on the first output shaft comprise a second driven gear for implementing the 2-range, a third driven gear for implementing the 3-range, a sixth driven gear for implementing the 6-range, and a seventh driven gear for implementing the 7-range, and the odd driven gears and even driven gears on the second output shaft comprise a fourth driven gear for implementing the 4-range, a fifth driven gear for implementing the 5-range, and an eighth driven gear for implementing the 8-range.

12. The double clutch transmission of claim 11, wherein the fifth driven gear and the eighth driven gear are adjacent to each other on the second output shaft, the joint synchro couples or decouples the fifth driven gear and the eighth driven gear to or from each other, and a hub of the joint synchro is integrally connected to the eighth driven gear.

13. The double clutch transmission of claim 12, wherein the second driven gear, the sixth driven gear, the third driven gear, and the seventh driven gear are sequentially disposed on the first output shaft, and a reverse driven gear for a reverse range is disposed between the second driven gear and the sixth driven gear on the first output shaft.

14. The double clutch transmission of claim 13, wherein the fourth driven gear, the eighth driven gear, and the fifth driven gear are sequentially disposed on the second output shaft, and a parking gear is integrally disposed at a side of the fourth driven gear on the second output shaft in parallel with the second driving gear and the second driven gear.

* * * * *